United States Patent
Overby

(10) Patent No.: US 6,834,874 B1
(45) Date of Patent: Dec. 28, 2004

(54) TRAILER SUSPENSION SYSTEM

(76) Inventor: Jerry Overby, 2812 W. Oak St., Sioux Falls, SD (US) 57105

(*) Notice: Subject to any disclaimer, the term of this patent is extended or adjusted under 35 U.S.C. 154(b) by 0 days.

(21) Appl. No.: 10/266,121

(22) Filed: Oct. 7, 2002

(51) Int. Cl.[7] ................................................ B60G 9/02
(52) U.S. Cl. ............................................. 280/124.116
(58) Field of Search .................. 280/124.116, 124.128, 280/124.13, 124.132, 124.134, 124.135, 124.133

(56) References Cited

U.S. PATENT DOCUMENTS

| | | | | |
|---|---|---|---|---|
| 3,630,541 A | * | 12/1971 | Carlson et al. | ........ 280/124.116 |
| 5,375,871 A | * | 12/1994 | Mitchell et al. | ....... 280/124.116 |
| 5,669,728 A | * | 9/1997 | Koba | .......................... 403/270 |
| 6,123,349 A | * | 9/2000 | Depue | ................. 280/124.106 |
| 6,508,393 B2 | * | 1/2003 | Chalin | ......................... 228/136 |
| 6,550,795 B1 | * | 4/2003 | Schlosser et al. | ........ 280/86.75 |

* cited by examiner

Primary Examiner—Faye M. Fleming
(74) Attorney, Agent, or Firm—Leonard & Proehl, Prof. L.L.C.

(57) ABSTRACT

A trailer suspension system for controlling the ride characteristics of a trailer. The trailer suspension system includes at least one suspension assembly being designed for being coupled between a frame of the trailer and an axle of the trailer. The suspension assembly is designed for absorbing shock from the axle of the trailer. The suspension assembly comprises a frame mounting assembly being designed for being coupled to the frame of the trailer. An axle mounting assembly is pivotally coupled to the frame mounting assembly. The axle mounting assembly is designed for being coupled to the axle of the trailer. An air spring assembly is coupled between the frame mounting assembly and the axle mounting assembly whereby the air spring assembly is designed for damping movement of the axle mounting assembly when the trailer is traveling over a surface.

15 Claims, 7 Drawing Sheets

TRAILER SUSPENSION SYSTEM

BACKGROUND OF THE INVENTION

1. Field of the Invention

The present invention relates to vehicle air suspension systems and more particularly pertains to a new trailer suspension system for controlling the ride characteristics of a trailer.

2. Description of the Prior Art

The use of vehicle air suspension systems is known in the prior art. U.S. Pat. No. 5,655,788 describes a system for lifting one or more wheels whose load-bearing capacity is not needed. Another type of vehicle air suspension system is U.S. Pat. No. 4,309,045 having an air suspension assembly that forms a substantially parallelogram shape for controlling ride characteristics of the vehicle. U.S. Pat. Nos. 4,497,507, 5,332,258, 6,428,026, 6,398,236 and 6,073,946 each have an air suspension system coupled between a frame and axle of the vehicle for controlling the ride characteristics of the vehicle. U.S. Pat. No. 3,237,957 has a compound spring suspension assembly for controlling the ride characteristics of the vehicle. U.S. Pat. No. 4,524,841 has a auxiliary wheel apparatus for controlling the ride characteristics of each of the axles of a trailer. U.S. Pat. No. 3,784,221 has an air ride suspension using a leaf spring and an air spring to control the ride characteristics of the vehicle. U.S. Pat. No. 4,858,949 has a trailing arm suspension for mounting to a longitudinally extending frame of the vehicle. U.S. Pat. No. Re. 33,630 has an air ride suspension that is coupled to the front axle of a vehicle for controlling the ride characteristics of the front wheels and axle of the vehicle. U.S. Pat. No. 4,033,608 has an air spring unit that is positioned between the leaf spring and frame of a vehicle to control the ride characteristics of the vehicle. U.S. Pat. No. 2,941,816 has a mounting assembly for mounting an axle to a frame of a vehicle that provides shock absorption for the vehicle. U.S. Pat. No. 4,007,801 has a pair of fluid distensible rollers that roll along a surface with the vehicle supported on the fluid distensible rollers such that the fluid distensible rollers conform to the surface to reduce impact to the vehicle.

While these devices fulfill their respective, particular objectives and requirements, the need remains for a system that has certain improved features inhibiting damage to the air spring when the air spring is compressed.

SUMMARY OF THE INVENTION

The present invention meets the needs presented above by providing the distal end of the arm member of the frame mounting assembly with an area greater than the cross-sectional area of the air spring assembly in a normalized state to inhibit the air spring assembly from coming into contact with frame and be compromised when the air spring assembly is compressed.

Still yet another object of the present invention is to provide a new trailer suspension system that has side edges of the saddle portion of the saddle member that each have a concave arcuate depression for optimizing the welding area between the saddle portion and the axle of the trailer.

To this end, the present invention generally comprises at least one suspension assembly being designed for being coupled between a frame of the trailer and an axle of the trailer. The suspension assembly is designed for absorbing shock from the axle of the trailer. The suspension assembly comprises a frame mounting assembly being designed for being coupled to the frame of the trailer. An axle mounting assembly is pivotally coupled to the frame mounting assembly. The axle mounting assembly is designed for being coupled to the axle of the trailer. An air spring assembly is coupled between the frame mounting assembly and the axle mounting assembly whereby the air spring assembly is designed for damping movement of the axle mounting assembly when the trailer is traveling over a surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
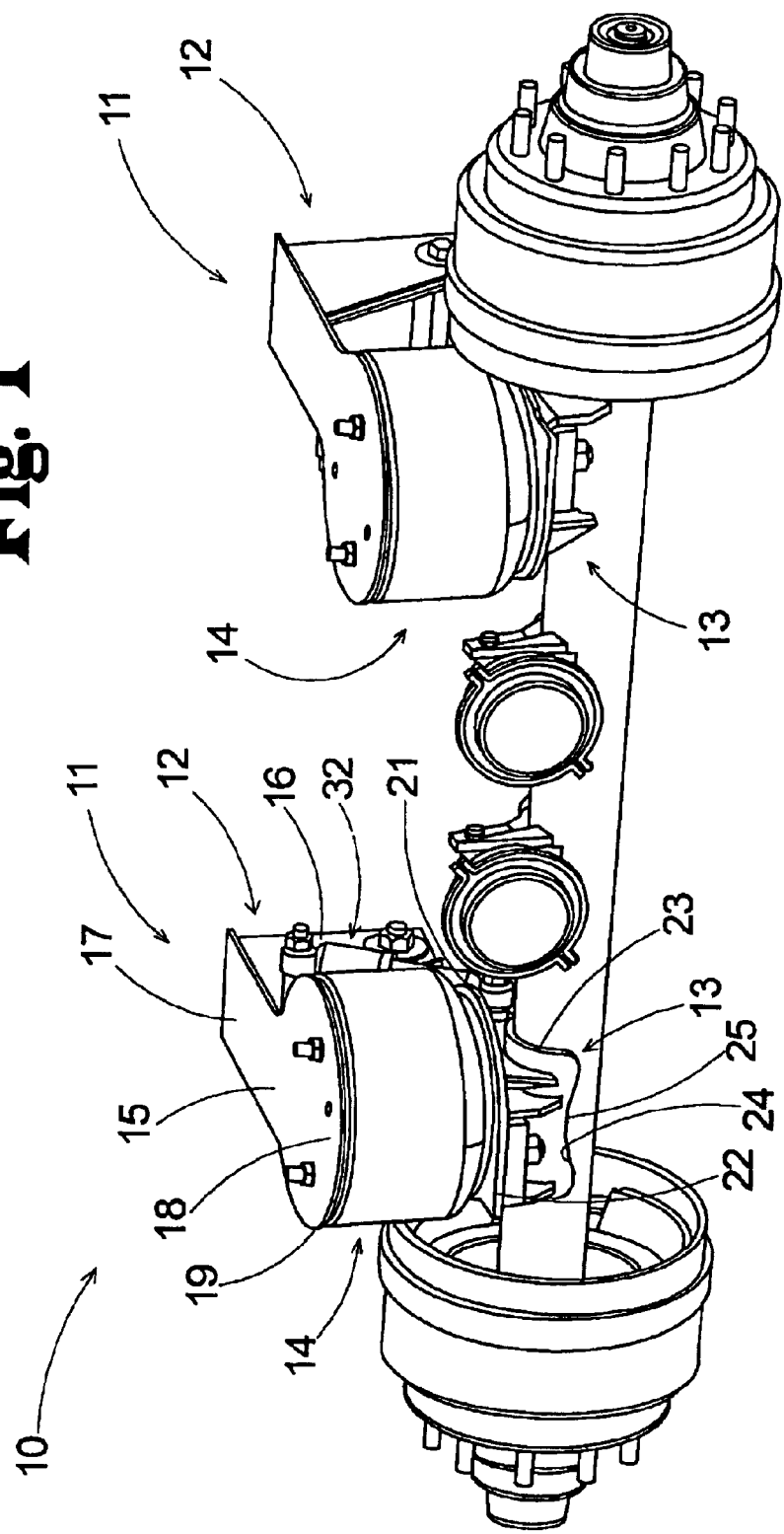
FIG. 1 is a perspective view of a new trailer suspension system according to the present invention shown coupled to an axle of the trailer.
Figure 2:
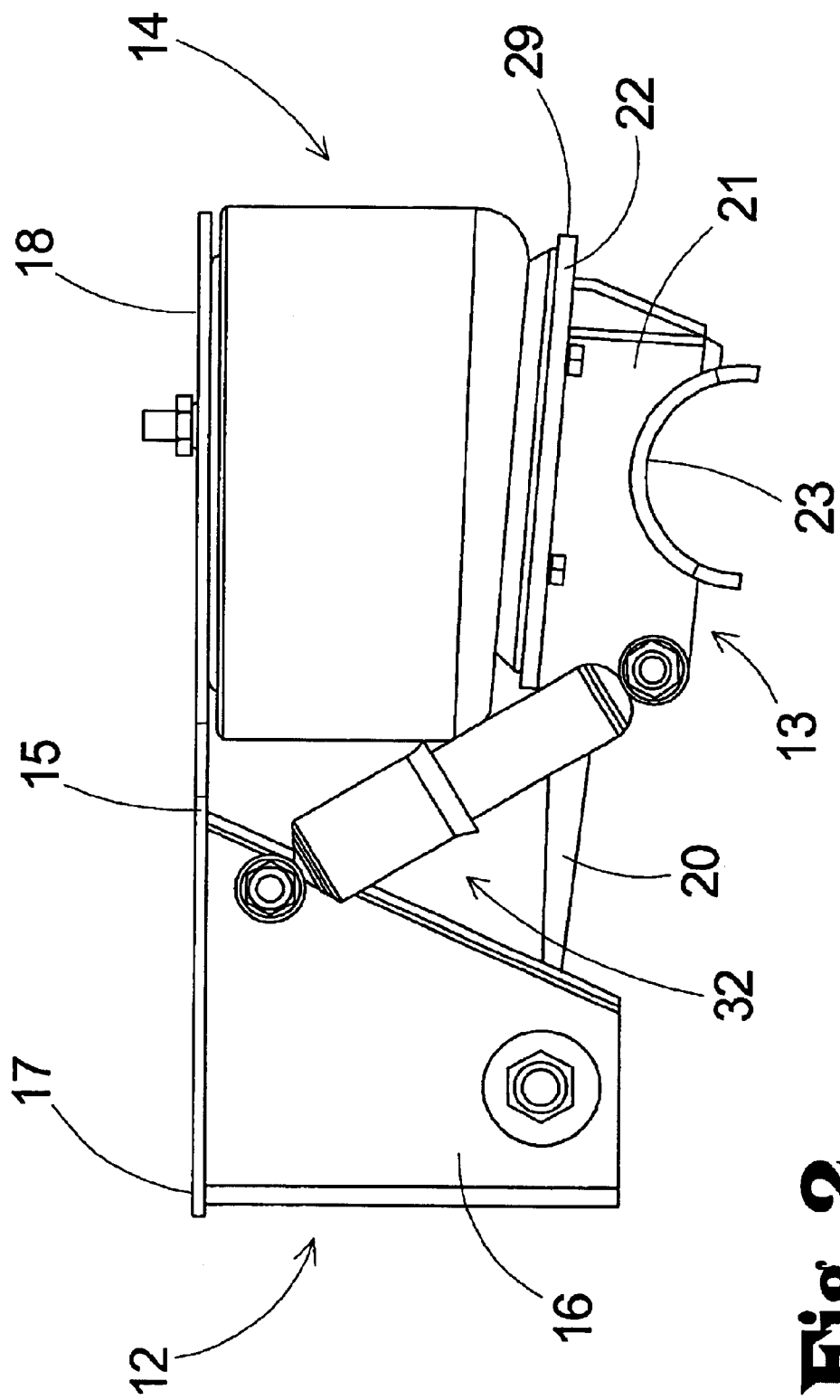
FIG. 2 is a side view of the present invention.
Figure 3:
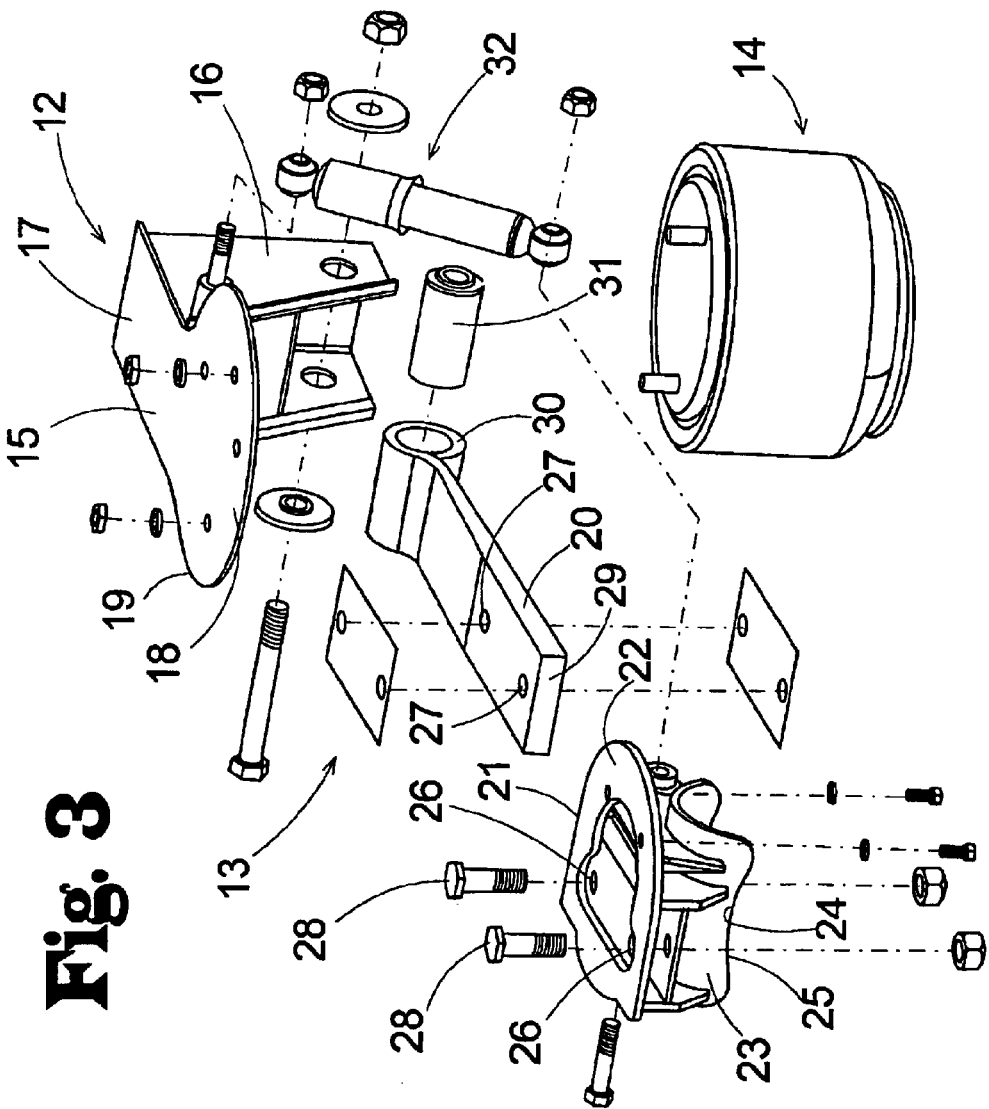
FIG. 3 is a exploded perspective view of the present invention.
Figure 4:
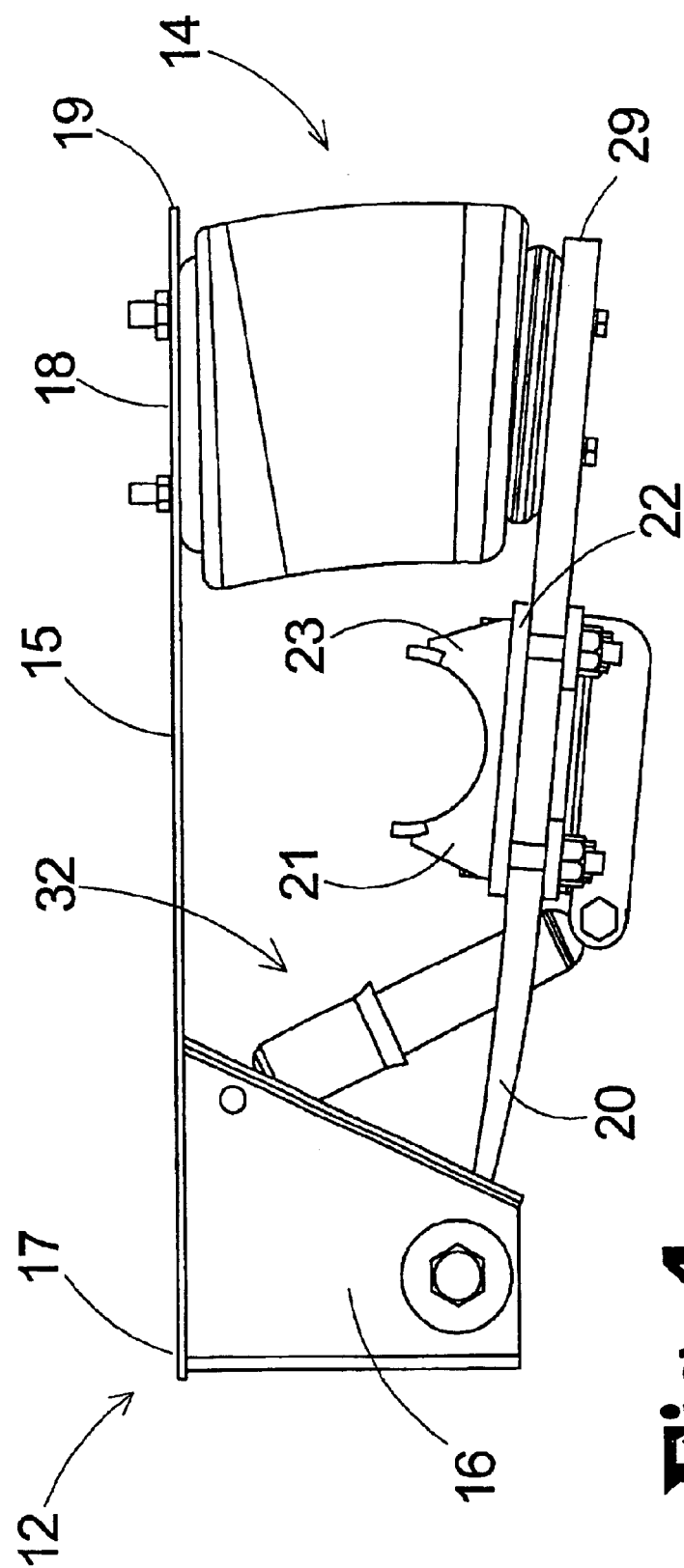
FIG. 4 is a side view of an embodiment of the present invention.
Figure 5:
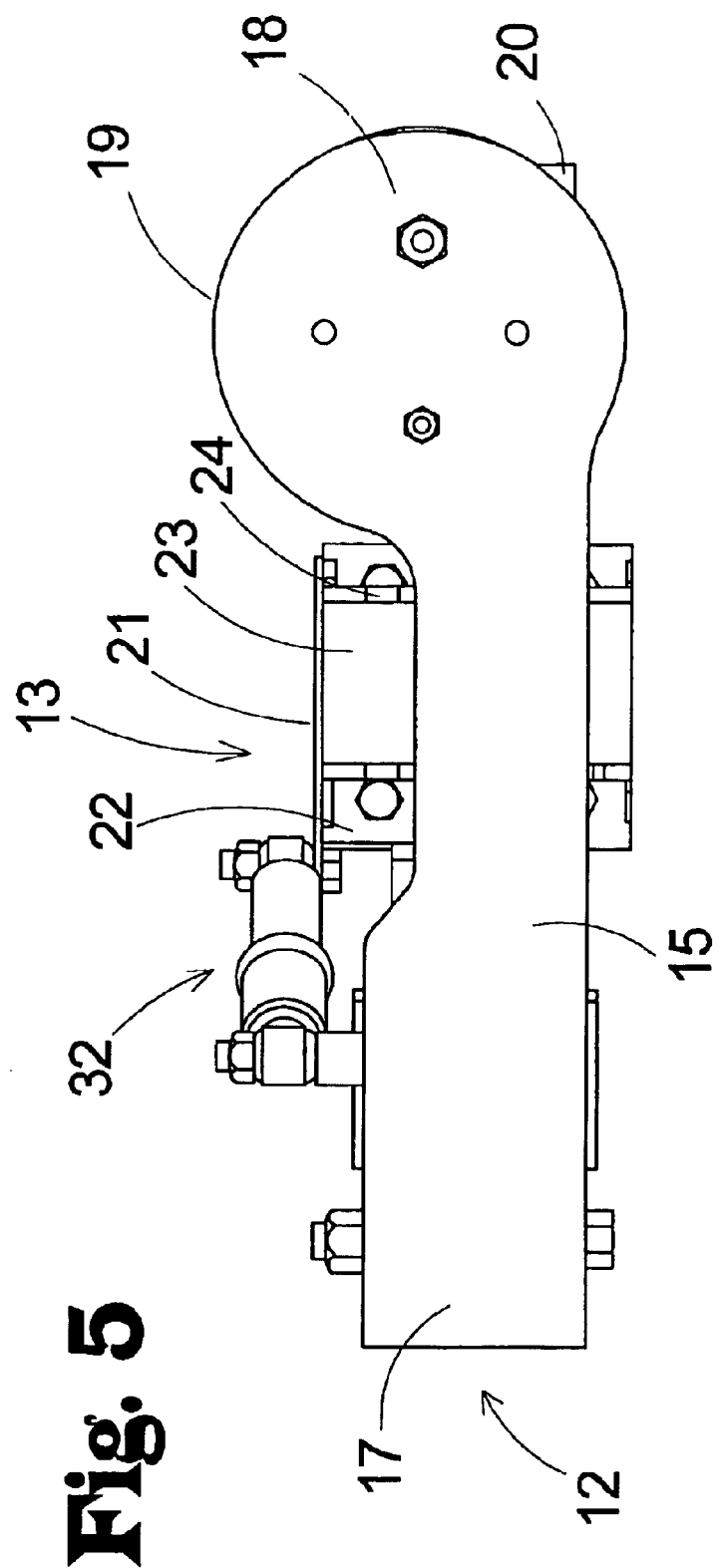
FIG. 5 is a top view of the embodiment of the present invention as shown in FIG. 4.
Figure 6:
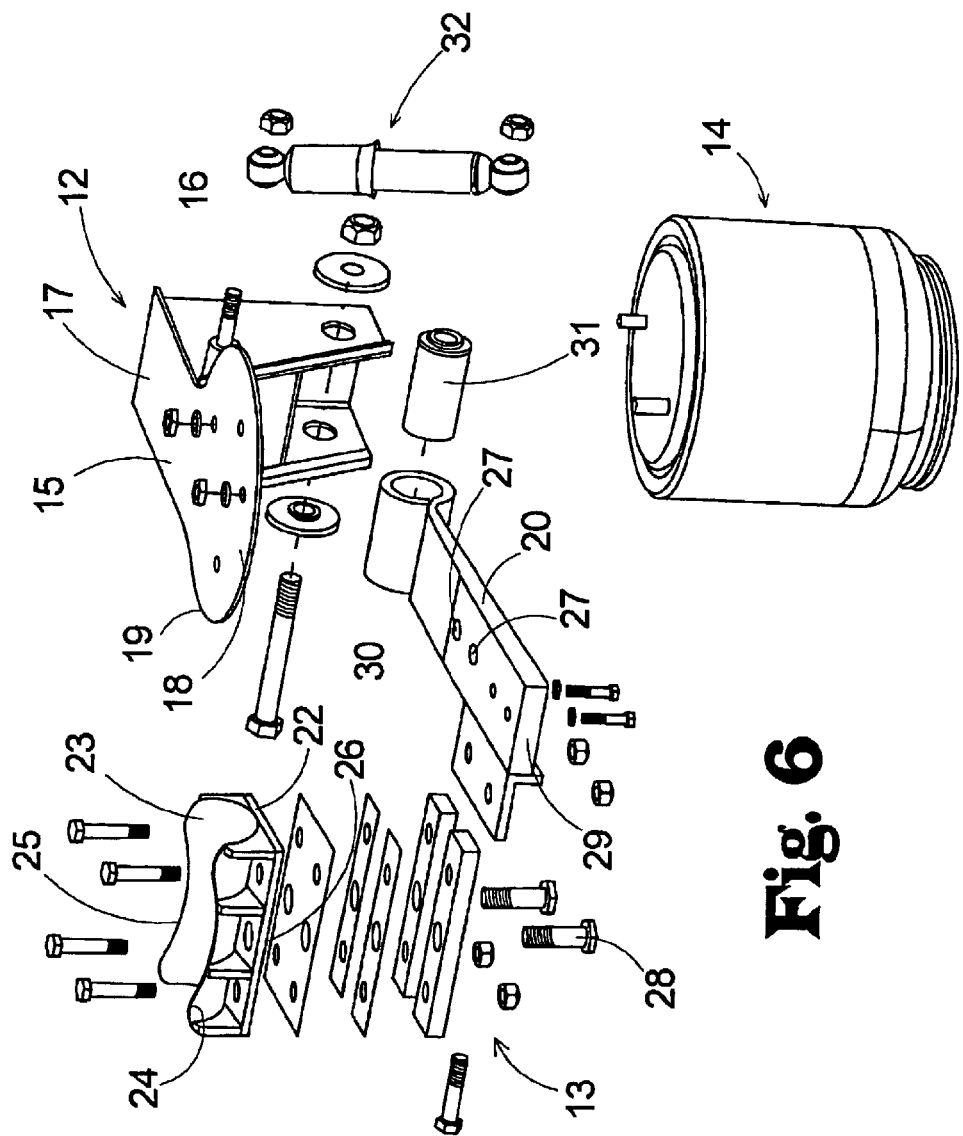
FIG. 6 is an exploded perspective view of the embodiment of the present invention shown in FIG. 4.

With reference now to the drawings, and in particular to FIGS. 1 through 7 thereof, a new trailer suspension system embodying the principles and concepts of the present invention and generally designated by the reference numeral 10 will be described.

As best illustrated in FIGS. 1 through 7, the trailer suspension system 10 generally comprises a plurality of suspension assemblies 11 being designed for being coupled between a frame of the trailer and an axle of the trailer. The suspension assemblies 11 are designed for absorbing shock from the axle of the trailer. Each of the suspension assemblies 11 comprises:

A frame mounting assembly 12 is de signed for being coupled to the frame of the trailer.

An axle mounting assembly 13 is pivotally coupled to the frame mounting assembly 12. The axle mounting assembly 13 is designed for being coupled to the axle of the trailer.

An air spring assembly 14 is coupled between the frame mounting assembly 12 and the axle mounting assembly 13 whereby the air spring assembly 14 is designed for damping movement of the axle mounting assembly 13 when the trailer is traveling over a surface.

The frame mounting assembly 12 comprises an arm member 15 and a mounting member 16. The mounting member 16 extends from the arm member 15. The arm member 15 is designed for being coupled to the frame of the trailer whereby the mounting member 16 extends away from the frame of the trailer. The axle mounting assembly 13 is pivotally coupled to the mounting member 16 of the frame mounting assembly 12 in a spaced relationship from the arm member 15.

The arm member 15 of the frame mounting assembly 12 comprises a base end 17 and a distal end 18. The base end 17 of the arm member 15 is coupled to the mounting member 16. The distal end 18 is positioned opposite the base end 17 whereby the distal end 18 of the arm member 15 is coupled to the air spring assembly 14 whereby the air spring assembly 14 is compressed between the arm member 15 and the axle mounting assembly 13.

The distal end 18 of the arm member 15 comprises a peripheral edge 19. The peripheral edge 19 of the distal end 18 extends beyond a diameter of the air spring assembly 14 when the air spring assembly 14 is in a normalized state whereby the distal end 18 inhibits the air spring assembly 14 from being compromised by extending around the arm member 15 when the air spring is compressed between the arm member 15 and the axle mounting assembly 13.

The axle mounting assembly 13 comprises an arm spring 20. The arm spring 20 is pivotally coupled to the frame mounting assembly 12. The air spring assembly 14 is couple to the arm spring 20 opposite the frame mounting assembly 12 whereby the air spring assembly 14 is compressed between the arm spring 20 of the axle mounting assembly 13 and the frame mounting assembly 12 for absorbing shock when wheels of a trailer encounter a rough portion of the surface. The arm spring 20 has a width of about 5 inches and a thickness of about 1⅛ inches to help reduce roll of the arm spring 20.

The axle mounting assembly 13 comprises a saddle member 21. The saddle member 21 is coupled to the arm spring 20. The saddle member 21 is designed for being coupled to the axle of the trailer whereby the saddle member 21 couples the axle of the trailer to the arm spring 20 of the axle mounting assembly 13.

The saddle member 21 of the axle mounting assembly 13 comprises a plate portion 22 and a saddle portion 23. The plate portion 22 is coupled to the saddle portion 23. The plate portion 22 of the saddle member 21 is coupled to the arm spring 20. The saddle portion 23 is designed for being coupled to the axle of the trailer.

The saddle portion 23 of the saddle member 21 comprises a substantially arcuate cross-section taken perpendicular to a longitudinal axis of the saddle portion 23 whereby the saddle portion 23 is designed for fitting over the axle of the trailer when the saddle member 21 is coupled to the axle of the trailer. The saddle portion 23 comprises pair of side edges 24. Each of the side edges 24 is positioned substantially parallel with the longitudinal axis of the saddle portion 23. Each of the side edges 24 of the saddle portion 23 comprises a concave arcuate depression 25 extending into the saddle portion 23 from the associated one of the side edges 24. The concave arcuate depression 25 of each of the side edges 24 is designed for optimizing an amount of welding area between the saddle portion 23 and the axle of the trailer.

The plate portion 22 of the saddle member 21 comprises pair of mounting apertures 26. The mounting apertures 26 of the plate portion 22 are aligned with a pair of securing apertures 27 extending through the arm spring 20. Each of a plurality of fasteners 28 extends through one of the mounting apertures 26 and one of the securing apertures 27 for securing the saddle member 21 to the arm spring 20 whereby the fasteners 28, such as 1 inch bolts, inhibit twisting of the saddle member 21 with respect to the arm spring 20.

The arm spring 20 comprises a free end 29 and a rolled end 30. The rolled end 30 of the arm spring 20 defining a receiving aperture 31. The receiving aperture 31s are designed for receiving a bushing member 32 of the axle mounting assembly 13 whereby the arm sp ring 20 is rotatable around the bushing member 32. The bushing member 32 is coupled to the frame mounting assembly 12 whereby the arm spring 20 is rotatable with respect to the frame mounting assembly 12. The 5 inch width of the arm spring 20 provides a greater bushing area for optimal contact with the bushing member 32.

A shock absorbing assembly 33 is coupled between the frame mounting member 16 and the axle mounting assembly 13. The shock absorbing assembly 33 is designed for absorbing force between the axle mounting assembly 13 and the frame mounting assembly 12 when the axle mounting assembly 13 pivots with respect to the frame mounting assembly 12.

The saddle member 21 is coupled to the arm spring 20 whereby the saddle member 21 is positioned directly under the air spring assembly 14. The saddle member 21 is designed for directing shock from the axle directly to the air spring assembly 14 when the trailer is traveling over the surface. The configuration of the saddle member 21 being positioned under the air spring assembly 14 has a load rating of about 23,000 pounds.

In an embodiment, as shown in FIGS. 4 through 7, the saddle member 21 is coupled to the arm spring 20 whereby the saddle member 21 is position between the air spring assembly 14 and the frame mounting assembly 12. The saddle member 21 is designed for positioning the axle of the trailer between the arm spring 20 and the frame mounting assembly 12 for increasing mechanical advantage to absorb shock when the trailer is traveling over the surface. The configuration of the saddle member 21 positioning the axle of the trailer between the axle mounting assembly 13 and the frame mounting assembly 12 provides a load rating of about 25,000 pounds.

Figure 7:
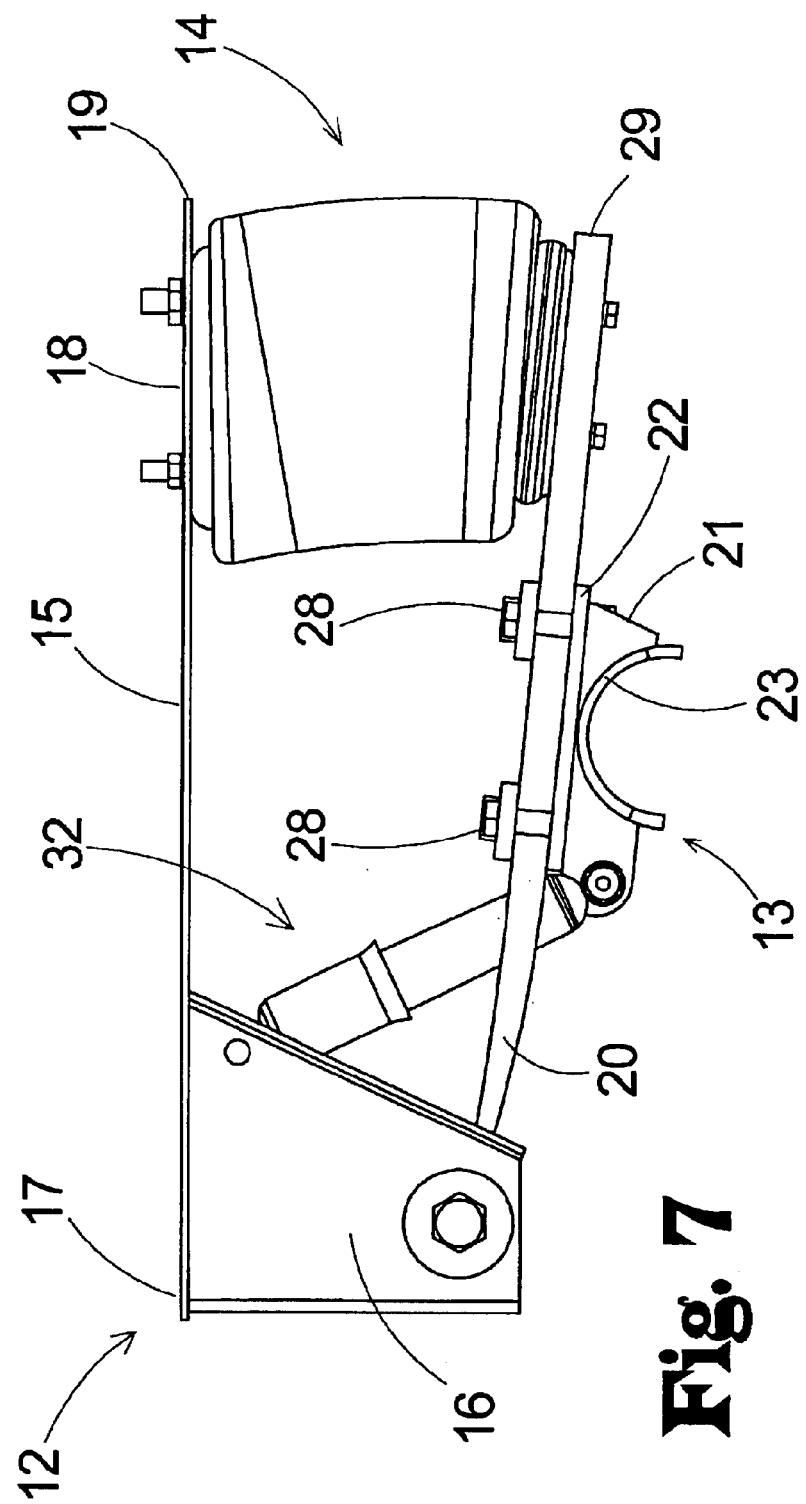
FIG. 7 is a side view of an embodiment of the present invention.

In an embodiment, as shown in FIG. 7. The saddle member 21 is coupled to the arm spring 20 whereby the saddle member 21 is position between the air spring assembly 14 and the frame mounting assembly 12. The saddle member 21 is designed for positioning the axle of the trailer below the arm spring 20 for maximizing mechanical advantage to absorb shock when the trailer is traveling over the surface. The configuration of the saddle member 21 positioning the axle of the trailer below the axle mounting assembly 13 provides a load rating of about 30,000 pounds.

In use, the saddle member 21 of the axle mounting assembly 13 of each of the suspension assemblies 11 is welded the axle of the trailer. The saddle member 21 is then coupled to the arm spring 20 of the axle mounting assembly 13 of the associated one of suspension assemblies 11. The air spring assembly 14 is then coupled between the arm spring 20 and the arm member 15 of the frame mounting assembly 12 of the associated one of the suspension assemblies 11. The air spring assembly 14 is pneumatically controlled by the driver to control the ride characteristics of the trailer when the trailer is being pulled along the road surface. The shock absorber assembly for each of suspension assemblies 11 is for dampening the effects of the forces on the arm spring 20 when the trailer passes over a rough surface and to ensure contact of the wheels with the surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer suspension system for absorbing shock to a trailer when the trailer travels over a surface, the trailer suspension system comprising:

at least one suspension assembly being adapted for being coupled between a frame of the trailer and an axle of the trailer, said suspension assembly being adapted for absorbing shock from the axle of the trailer;

said suspension assembly comprising a frame mounting assembly, said frame mounting assembly being adapted for being coupled to the frame of the trailer;

said suspension assembly comprising an axle mounting assembly being pivotally coupled to said frame mounting assembly, said axle mounting assembly being adapted for being coupled to the axle of the trailer;

said suspension assembly comprising an air spring assembly, said air spring assembly being coupled between said frame mounting assembly and said axle mounting assembly such that said air spring assembly is adapted for damping movement of said axle mounting assembly when the trailer is traveling over a surface;

said axle mounting assembly comprising an arm spring, said arm spring being pivotally coupled to said frame mounting assembly, said air spring assembly being couple to said arm spring opposite said frame mounting assembly such that said air spring assembly is compressed between said arm spring of said axle mounting assembly and said frame mounting assembly for absorbing shock when wheels of a trailer encounter a rough portion of the surface;

said axle mounting assembly comprising a saddle member, said saddle member being coupled to said arm spring, said saddle member being adapted for being coupled to the axle of the trailer such that said saddle member couples the axle of the trailer to said arm spring of the axle mounting assembly;

said saddle member of said axle mounting assembly comprising a plate portion and a saddle portion, said plate portion being coupled to said saddle portion, said plate portion of said saddle member being coupled to said arm spring, said saddle portion being adapted for being coupled to the axle of the trailer, said saddle portion extending around less than three quarters of a circumference of the axle; and said saddle portion comprising pair of side edges, each of said side edges being positioned substantially parallel with a longitudinal axis of said saddle portion, each of said side edges of said saddle portion comprising a concave arcuate depression extending into said saddle portion from the associated one of said side edges, said concave arcuate depression of each of said side edges being adapted for optimizing an amount of welding area between said saddle portion and the axle of the trailer.

2. The trailer suspension system as set forth in claim 1, further comprising:

said frame mounting assembly comprising an arm member and a mounting member, said mounting member extending from said arm member, said arm member being adapted for being coupled to the frame of the trailer such that said mounting member extends away from the frame of the trailer, said axle mounting assembly being pivotally coupled to said mounting member of said frame mounting assembly in a spaced relationship from said arm member.

3. The trailer suspension system as set forth in claim 2, further comprising:

said arm member of said frame mounting assembly comprising a base end and a distal end, said base end of said arm member being coupled to said mounting member, said distal end being positioned opposite said base end such that said distal end of said arm member is coupled to said air spring assembly such that said air spring assembly is compressed between said arm member and said axle mounting assembly.

4. The trailer suspension system as set forth in claim 3, further comprising:

said distal end of said arm member comprising a peripheral edge, said peripheral edge of said distal end extending beyond a diameter of said air spring assembly when said air spring assembly is in a normalized state such that said distal end inhibits said air spring assembly from being compromised by extending around said arm member when said air spring is compressed between said arm member and said axle mounting assembly.

5. The trailer suspension system as set forth in claim 1, further comprising:

said saddle portion of said saddle member comprising a substantially arcuate cross-section taken perpendicular to a longitudinal axis of said saddle portion such that said saddle portion is adapted for fitting over the axle of the trailer when said saddle member is coupled to the axle of the trailer.

6. The trailer suspension system as set forth in claim 1, further comprising:

said plate portion of said saddle member comprising pair of mounting apertures, said mounting apertures of said plate portion being aligned with a pair of securing apertures extending through said arm spring, each of a plurality of fasteners extending through one of said mounting apertures and one of said securing apertures for securing said saddle member to said arm spring such that said fasteners inhibit twisting of said saddle member with respect to said arm spring.

7. The trailer suspension system as set forth in claim 1, further comprising:

said saddle member being coupled to said arm spring such that said saddle member is positioned directly under said air spring assembly, said saddle member being adapted for directing shock from the axle directly to said air spring assembly when the trailer is traveling over the surface.

8. The trailer suspension system as set forth in claim 1, further comprising:

said saddle member being coupled to said arm spring such that said saddle member is position between said air spring assembly and said frame mounting assembly, said saddle member being adapted for positioning the axle of the trailer between said arm spring and said frame mounting assembly for increasing mechanical advantage to absorb shock when the trailer is traveling over the surface.

9. The trailer suspension system as set forth in claim 1, further comprising:

said saddle member being coupled to said arm spring such that said saddle member is position between said air spring assembly and said frame mounting assembly, said saddle member being adapted for positioning the axle of the trailer below said arm spring for maximizing mechanical advantage to absorb shock when the trailer is traveling over the surface.

10. The trailer suspension system as set forth in claim 1, further comprising:

said arm spring comprising a free end and a rolled end, said rolled end of said arm spring defining a receiving aperture, said receiving apertures being adapted for receiving a bushing member of said axle mounting assembly such that said arm spring is rotatable around said bushing member, said busing member being coupled to said frame mounting assembly such that said arm spring is rotatable with respect to said frame mounting assembly.

11. The trailer suspension system as set forth in claim 1, further comprising:

a shock absorbing assembly being coupled between said frame mounting member and said axle mounting assembly, said shock absorbing assembly being adapted for absorbing force between said axle mounting assembly and said frame mounting assembly when said axle mounting assembly pivots with respect to said frame mounting assembly.

12. A trailer suspension system for absorbing shock to a trailer when the trailer travels over a surface, the trailer suspension system comprising:

a pair of suspension assemblies being adapted for being coupled between a frame of the trailer and an axle of the trailer, said suspension assemblies being adapted for absorbing shock from the axle of the trailer;

each of said suspension assemblies comprising:

a frame mounting assembly being adapted for being coupled to the frame of the trailer;

an axle mounting assembly being pivotally coupled to said frame mounting assembly, said axle mounting assembly being adapted for being coupled to the axle of the trailer;

an air spring assembly being coupled between said frame mounting assembly and said axle mounting assembly such that said air spring assembly is adapted for damping movement of said axle mounting assembly when the trailer is traveling over a surface;

said frame mounting assembly comprising an arm member and a mounting member, said mounting member extending from said arm member, said arm member being adapted for being coupled to the frame of the trailer such that said mounting member extends away from the frame of the trailer, said axle mounting assembly being pivotally coupled to said mounting member of said frame mounting assembly in a spaced relationship from said arm member;

said arm member of said frame mounting assembly comprising a base end and a distal end, said base end of said arm member being coupled to said mounting member, said distal end being positioned opposite said base end such that said distal end of said arm member is coupled to said air spring assembly such that said air spring assembly is compressed between said arm member and said axle mounting assembly;

said distal end of said arm member comprising a peripheral edge, said peripheral edge of said distal end extending beyond a diameter of said air spring assembly when said air spring assembly is in a normalized state such that said distal end inhibits said air spring assembly from being compromised by extending around said arm member when said air spring is compressed between said arm member and said axle mounting assembly;

said axle mounting assembly comprising an arm spring, said arm spring being pivotally coupled to said frame mounting assembly, said air spring assembly being couple to said arm spring opposite said frame mounting assembly such that said air spring assembly is compressed between said arm spring of said axle mounting assembly and said frame mounting assembly for absorbing shock when wheels of a trailer encounter a rough portion of the surface;

said axle mounting assembly comprising a saddle member, said saddle member being coupled to said arm spring, said saddle member being adapted for being coupled to the axle of the trailer such that said saddle member couples the axle of the trailer to said arm spring of the axle mounting assembly;

said saddle member of said axle mounting assembly comprising a plate portion and a saddle portion, said plate portion being coupled to said saddle portion, said plate portion of said saddle member being coupled to said arm spring, said saddle portion being adapted for being coupled to the axle of the trailer, said saddle portion extending around less than three quarters of a circumference of the axle;

said saddle portion of said saddle member comprising a substantially arcuate cross-section taken perpendicular to a longitudinal axis of said saddle portion such that said saddle portion is adapted for fitting over the axle of the trailer when said saddle member is coupled to the axle of the trailer;

said saddle portion comprising pair of side edges, each of said side edges being positioned substantially parallel with the longitudinal axis of said saddle portion, each of said side edges of said saddle portion comprising a concave arcuate depression extending into said saddle portion from the associated one of said side edges, said concave arcuate depression of each of said side edges being adapted for optimizing an amount of welding area between said saddle portion and the axle of the trailer;

said plate portion of said saddle member comprising a pair of mounting apertures, said mounting apertures of said plate portion being aligned with a pair of securing apertures extending through said arm spring, each of a plurality of fasteners extending through one of said mounting apertures and one of said securing apertures for securing said saddle member to said arm spring such that said fasteners inhibit twisting of said saddle member with respect to said arm spring;

said arm spring comprising a free end and a rolled end, said rolled end of said arm spring defining a receiving aperture, said receiving aperture being adapted for receiving a bushing member of said axle mounting assembly such that said arm spring is rotatable around said bushing member, said busing member being coupled to said frame mounting assembly such that said arm spring is rotatable with respect to said frame mounting assembly; and a shock absorbing assembly being coupled between said frame mounting member and said axle mounting assembly, said shock absorbing assembly being adapted for absorbing force between said axle mounting assembly and said frame mounting assembly when said axle mounting assembly pivots with respect to said frame mounting assembly.

13. The trailer suspension system as set forth in claim 12, further comprising:

said saddle member being coupled to said arm spring such that said saddle member is positioned directly under said air spring assembly, said saddle member being adapted for directing shock from the axle directly to said air spring assembly when the trailer is traveling over the surface.

14. The trailer suspension system as set forth in claim 12, further comprising:

said saddle member being coupled to said arm spring such that said saddle member is position between said air spring assembly and said frame mounting assembly, said saddle member being adapted for positioning the axle of the trailer between said arm spring and said frame mounting assembly for increasing mechanical advantage to absorb shock when the trailer is traveling over the surface.

15. The trailer suspension system as set forth in claim 12, further comprising:

said saddle member being coupled to said arm spring such that said saddle member is position between said air spring assembly and said frame mounting assembly, said saddle member being adapted for positioning the axle of the trailer below said arm spring for maximizing mechanical advantage to absorb shock when the trailer is traveling over the surface.

* * * * *